United States Patent
Ding

(10) Patent No.: US 10,043,083 B2
(45) Date of Patent: *Aug. 7, 2018

(54) INTELLIGENT REAR-VIEW MIRROR SYSTEM

(71) Applicant: THUNDER POWER NEW ENERGY VEHICLE DEVELOPMENT COMPANY LIMITED, Central (HK)

(72) Inventor: Jia-Wei Ding, Taipei (TW)

(73) Assignee: THUNDER POWER NEW ENERGY VEHICLE DEVELOPMENT COMPANY LIMITED, Central (HK)

( * ) Notice: Subject to any disclaimer, the term of this patent is extended or adjusted under 35 U.S.C. 154(b) by 316 days.

This patent is subject to a terminal disclaimer.

(21) Appl. No.: 14/923,431

(22) Filed: Oct. 27, 2015

(65) Prior Publication Data

US 2017/0113616 A1    Apr. 27, 2017

(51) Int. Cl.
*B60R 1/02*        (2006.01)
*G06K 9/00*       (2006.01)
(Continued)

(52) U.S. Cl.
CPC ............ *G06K 9/00845* (2013.01); *B60R 1/04* (2013.01); *B60R 1/12* (2013.01); *B60R 2001/1253* (2013.01)

(58) Field of Classification Search
CPC .. H04N 5/2259; H04N 5/2257; H04N 5/2254; G03B 17/17; B60R 1/04;
(Continued)

(56) References Cited

U.S. PATENT DOCUMENTS 4,793,690 A * 12/1988 Gahan ..................... B60R 1/088
250/214 D
4,890,314 A * 12/1989 Judd ....................... H04N 1/195
348/14.01
(Continued)

FOREIGN PATENT DOCUMENTS

DE    10 2010 023160 A1    12/2011
EP          0757273 A1 *    2/1997    ......... G02B 27/1066
(Continued)

OTHER PUBLICATIONS

European Search Report for EP 16193464.1 dated Mar. 17, 2017, 6 pages.
(Continued)

*Primary Examiner* — Dramos I Kalapodas
(74) *Attorney, Agent, or Firm* — Kilpatrick Townsend & Stockton LLP

(57) ABSTRACT

Described herein is a rear view mirror system that is configured to adjust to a user's position without direct user interaction. In some embodiments, a camera may be included in the rear view mirror system so that its line of sight is perpendicular to a reflective surface. The camera may capture a digital image of the user. Eye patterns may be identified from the image information to determine an appropriate position for the mirror. In some embodiments, the mirror may be repositioned so that the camera's line of sight is directed halfway between the identified eye information and the center of a rear window. In some embodiments, the mirror may be re-adjusted periodically.

18 Claims, 7 Drawing Sheets

(51) Int. Cl.
*B60R 1/12* (2006.01)
*B60R 1/04* (2006.01)

(58) Field of Classification Search
CPC ........... B60R 1/08; B60R 1/086; G06F 3/013; G02B 27/143; G02B 27/1066; G07C 5/08
See application file for complete search history.

(56) References Cited

U.S. PATENT DOCUMENTS

| | | | |
|---|---|---|---|
| 5,694,259 A * | 12/1997 | Brandin | B60R 1/02 307/10.1 |
| 5,706,144 A * | 1/1998 | Brandin | B60R 1/02 307/10.1 |
| 6,324,453 B1 | 11/2001 | Breed et al. | |
| 6,501,536 B1 | 12/2002 | Fredricks | |
| 6,630,888 B2 * | 10/2003 | Lang | B60Q 1/2665 340/425.5 |
| 7,311,428 B2 | 12/2007 | DeLine et al. | |
| 8,047,667 B2 * | 11/2011 | Weller | B60R 1/12 359/879 |
| 8,200,397 B2 | 6/2012 | Ryu et al. | |
| 8,391,554 B2 | 5/2013 | Lee et al. | |
| 2003/0169213 A1 | 9/2003 | Spero | |
| 2006/0171704 A1 * | 8/2006 | Bingle | B60R 11/04 396/419 |
| 2010/0232045 A1 * | 9/2010 | DeWard | B60R 1/04 359/843 |
| 2010/0320045 A1 | 12/2010 | Muska | |
| 2011/0122520 A1 | 5/2011 | Verheyden | |
| 2012/0062743 A1 | 3/2012 | Lynam et al. | |
| 2013/0258512 A1 | 10/2013 | Raz et al. | |
| 2013/0321629 A1 * | 12/2013 | Zhang | H04N 17/002 348/148 |
| 2015/0030207 A1 * | 1/2015 | Sikroria | B60R 1/07 382/104 |
| 2015/0210218 A1 | 7/2015 | Kuenzner | |
| 2015/0277203 A1 * | 10/2015 | VanderPloeg | B60R 1/088 349/113 |
| 2017/0113627 A1 | 4/2017 | Ding | |
| 2017/0158135 A1 | 6/2017 | Ding | |

FOREIGN PATENT DOCUMENTS

| | | |
|---|---|---|
| EP | 0757273 A1 | 5/1997 |
| KR | 2005 0122573 A | 12/2005 |

OTHER PUBLICATIONS

U.S. Appl. No. 14/967,389, filed Dec. 14, 2015, Non-Final Rejection dated Apr. 18, 2016, all pages.
U.S. Appl. No. 14/967,389, filed Dec. 14, 2015, Final Rejection dated Jul. 21, 2016, all pages.
U.S. Appl. No. 14/967,389, filed Dec. 14, 2015, Notice of Allowance dated Jan. 13, 2017, all pages.

* cited by examiner

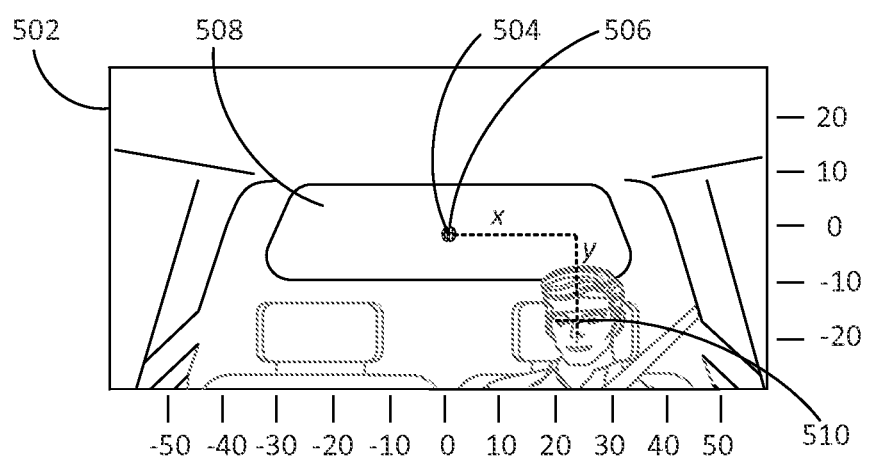
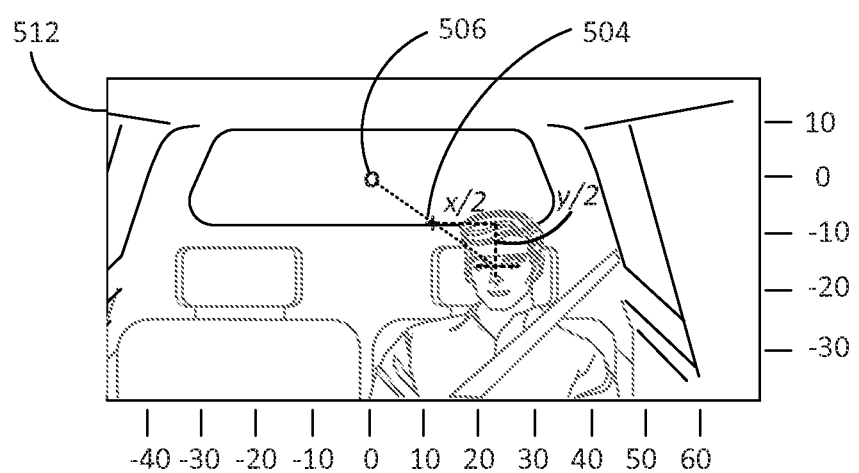
FIG. 5

INTELLIGENT REAR-VIEW MIRROR SYSTEM

BACKGROUND

Effective use of vehicle mirrors are an essential part of safe driving. However, a vehicle mirror can be knocked out of place, or may become ineffective if the driver is repositioned. For example, the driver may be forced to lean forward under certain driving conditions. This changes the driver's perspective in the rear view mirror, and may cause the rear view mirror to be ineffective, as the driver can no longer see vehicles behind him. Furthermore, reaching up to readjust the rear view mirror while driving may be dangerous, as it takes the driver's attention away from operation of the vehicle.

SUMMARY

The present disclosure solves these and other problems with the current technology. In particular, the disclosure provides an intelligent rear view mirror system in which a rear view mirror is automatically adjusted to a driver's height and position. To do this, the rear view mirror is fitted with multiple actuation devices capable of rotating the rear view mirror around a horizontal and/or vertical axis (e.g., up and down, or from side to side). A camera positioned perpendicular to the mirror surface may capture an image of the driver. A processor device may process this image to determine the location of the driver's eyes with respect to the rear window. In order to properly position the mirror, the rear view mirror may be rotated so that the camera's line of sight bisects the location of the driver's eyes and the rear window. In some embodiments, the rear view mirror may be placed in "follow" mode, in which the rear view mirror constantly (or on a periodic basis) adjusts to the driver's position.

BRIEF DESCRIPTION OF THE DRAWINGS

Various embodiments in accordance with the present disclosure will be described with reference to the drawings, in which:

FIG. 5 depicts example rear view images that may be captured and used to adjust to an appropriate mirror position in accordance with at least some embodiments;

DETAILED DESCRIPTION

Figure 1:
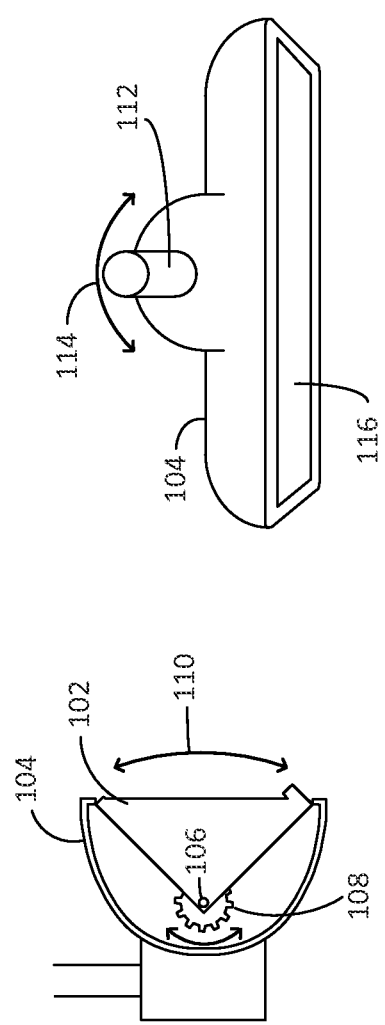
FIG. 1A and FIG. 1B depict an example rear view mirror system that may be implemented in accordance with at least some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Described herein is an intelligent rear view mirror system configured to adjust to a user's height and seating position automatically, or without user interaction. In some embodiments, a camera mounted on the rear view mirror system captures an image that includes the user and uses one or more computer vision techniques to identify the user's eye. Once identified, the rear view mirror may be rotated from a default position to a position that enables the user to view objects through the rear window of a vehicle. In some embodiments, the default position in the rear view mirror system may be pre-programmed by a manufacturer of the rear view mirror system. For example the manufacturer may set the center of a rear window as a default position, such that the rear view mirror system can identify the mirror's position with respect to the default position.

In some embodiments, the rear view mirror system may comprise a semi-transparent reflective surface and an opaque reflective surface, with a space between the two. In some embodiments, the semi-transparent reflective surface may be a one-way mirror or tinted glass. In some embodiments, the mirror may comprise a prismatic wedge mirror. In some embodiments, the rear view mirror system may comprise a single opaque reflective surface. In some embodiments, a camera configured to capture digital input may be positioned so that the camera's line of sight is perpendicular to the semi-transparent reflective surface. In some embodiments, the rear view mirror system may include multiple cameras. For example, the rear view mirror system may include two cameras, each configured to capture different image information. In some embodiments, the camera may be positioned behind the first reflective surface. In some embodiments, the camera may be mounted on a rear view mirror housing.

In some embodiments, the rear view mirror system may be in communication with a server or other service provider computer located outside of the vehicle in which the rear view mirror system is installed. The service provider computer may be configured to perform one or more calculations related to the automatic adjustment of the rear view mirror system. In some embodiments, the vehicle itself may include a processing device configured to perform one or more calculations related to the automatic adjustment of the rear view mirror system.

In some embodiments, the rear view mirror system may be placed into a "follow" mode, in which a camera will continue to (or periodically) capture digital image information related to the user and may adjust the rear view mirror position each time the user's position information is updated. In some embodiments, the rear view mirror system may automatically return to a default position upon being knocked out of place. This may enable the camera of the rear view mirror system to re-acquire image information for the user.

FIG. 1 depicts an example rear view mirror system that may be implemented in accordance with at least some embodiments. FIG. 1 is broken up into FIG. 1A and FIG. 1B in order to better illustrate some features of the disclosure.

FIG. 1A depicts a side-view cutout of an example rear view mirror system. Depicted in FIG. 1A, is a mirror unit 102 positioned within a mirror housing 104. The mirror unit 102 is held within the mirror housing 104 so that it is capable of rotating about an axis that runs the length of the mirror housing 104. For example, the mirror unit may be held to the mirror housing 104 by use of pins or studs 106. Additionally, a tilt actuation device 108 may be coupled with the mirror unit to cause it to rotate along a range of motion 110. Range of motion 110, as depicted, is a rotation about an axis running parallel to, or along the length of, the rear view mirror unit. In other words, the mirror unit itself is tilted up or down through range of motion 110. For example, the mirror unit may be adjusted along this range of motion 110 to account for a driver's height. In some embodiments, the entire mirror housing may be rotated along range of motion 110 using the tilt actuation device 106. The mirror unit itself will be described in greater detail with respect to FIG. 3 below.

The tilt actuation device 108 may be any device capable of causing a tilt or rotation of the mirror unit within the mirror housing. For example, the tilt actuation device 108 may be a motor, or other rotary actuation device. For example, the tilt actuation device 108 may be a servomotor that allows for precise control of angular or linear position, velocity and/or acceleration. In some embodiments, the tilt actuation device 108 may include a piston attached to the mirror unit in such a way that a rotation may be caused by pushing or pulling the mirror unit at the attachment position. The rear view mirror system may be configured to rotate the mirror unit 102 to a particular position and hold the mirror unit 102 in that position.

FIG. 1B depicts a top-down view of an example rear view mirror system. As depicted, the rear view mirror system may be connected to a vehicle via an arm 112. The mirror housing 104 may be rotatable along a second range of motion 114 around the arm 112. Furthermore, a second tilt actuation device may be used to rotate the mirror housing 104 in this way. The second tilt actuation device may be located within the mirror housing 104, or it may be located at the end of the arm distal to the mirror housing 104. The second tilt actuation device may be configured to rotate the mirror housing along range of motion 114 so that a reflective surface 116 is facing a particular direction. The second tilt actuation device may also be configured to hold the mirror housing 104 in a particular position. In some embodiments, tilt actuation device 108 and the second tilt actuation device may be different types of actuation devices.

Figure 2:
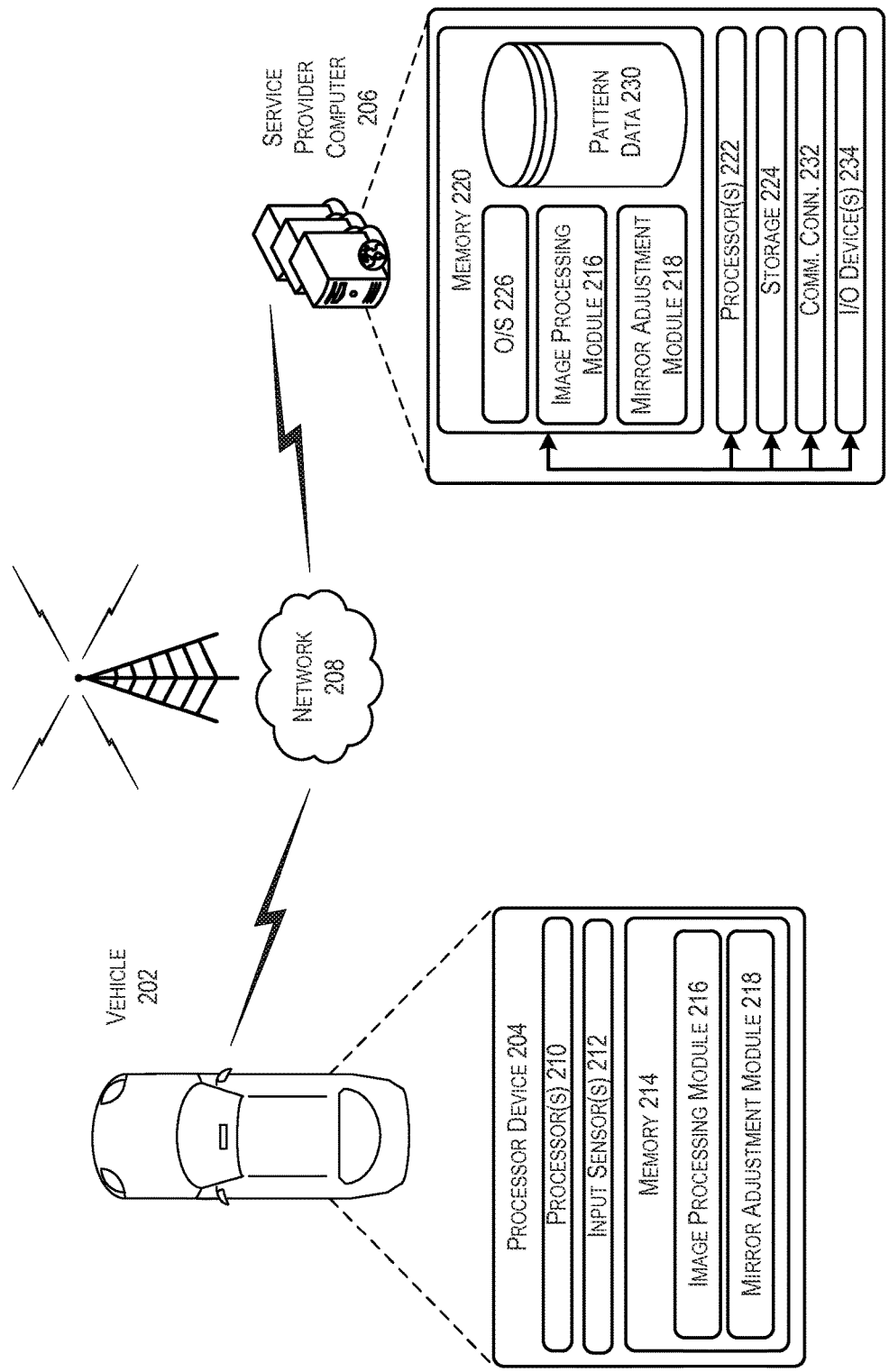
FIG. 2 depicts system or architecture in which techniques for processing image information may be implemented in accordance with the disclosure.

FIG. 2 depicts system or architecture in which techniques for processing image information may be implemented in accordance with the disclosure. In some examples, a vehicle 202 may include a processor device 204. In some embodiments, the processor device 204 may be configured to communicate with a service provider computer 206 via a network 208, or via other network connections. The processor device 204 or the service provider computer 206 may be configured to process an image received from a camera associated with the rear view mirror system and provide instructions for adjusting a mirror position.

The processor device 204 may be any type of computing device capable of performing the described functions. The processor device 204 may include one or more processors 210 capable of processing input from one or more input sensors 212. As is known in the art, there are a variety of input sensors 212 capable of detecting input related to a user or vehicle conditions, such as accelerometers, cameras, microphones, etc. The input obtained by the input sensors may be from a variety of data input types, including, but not limited to, audio data, visual data, or biometric data. Programmatic code for an application or module utilized in the implementation of at least some embodiments may be stored and executed from the memory 214 of processor device 204. The processor device 204 may include a module for processing image information to determine a viewer position (image processing module 216) and/or a module for providing movement instructions to a mirror unit (mirror adjustment module 218).

In some examples, the network(s) 208 may include any one or a combination of many different types of networks, such as cable networks, the Internet, wireless networks, cellular networks, and other private and/or public networks. It is also noted that the described techniques may apply in other client/server arrangements, as well as in non-client/server arrangements (e.g., locally stored applications, peer-to-peer systems, etc.). In an exemplary embodiment, the processor device 304 may communicate with a network hub using one or more wireless communication networks (e.g., 3G, 4G, etc.). The network hub may, in turn, utilize a physical connection (e.g., copper cable, T1, Ethernet, etc.) to communicate with the service provider computer at a network address.

The service provider computer 206 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that, in some embodiments, the service provider computer 206 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the service provider computer 206 may include at least one memory 220 and one or more processing units (or processor(s)) 222. The processor(s) 222 may be implemented as appropriate in hardware, computer-executable instructions, firmware or combinations thereof. Computer-executable instruction or firmware implementations of the processor(s) 222 may include computer-executable or machine executable instructions written in any suitable programming language to perform the various functions described.

The memory 220 may store program instructions that are loadable and executable on the processor(s) 210 and/or processor(s) 222, as well as data generated during the execution of these programs. Depending on the configuration and type of service provider computer 206, the memory 220 may be volatile (such as random access memory (RAM)) and/or non-volatile (such as read-only memory (ROM), flash memory, etc.). The service provider computer 206 may also include additional storage 224, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 220 may include multiple different types of memory, such as static random access memory (SRAM), dynamic random access memory (DRAM) or ROM. Turning to the contents of the memory 220 in more detail, the memory 220 may include an operating system 226 and one or more application programs or services for implementing the features disclosed herein including at least a module for processing image information to determine a viewer position (image processing module 216) and/or a module for providing movement instructions to a mirror unit (mirror adjustment module 218). The memory 220 may also include pattern data 230, which provides data related to identifying portions of image information. In some embodiments, the pattern data 230 may be stored in a database.

The memory 220 and the additional storage 224, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of the processor device 204 or the service provider computer 206. The service provider computer 206 may also contain communications connection(s) 232 that allow the service provider computer 206 to communicate with a stored database, another computing device or server, user terminals, and/or other devices on the network(s) 208. The service provider computer 206 may also include input/output (I/O) device(s) and/or ports 234, such as for enabling connection with a keyboard, a mouse, a pen, a voice input device, a touch input device, a display, speakers, a printer, etc.

Turning to the contents of the memory 220 in more detail, the memory 220 may include an operating system 226, a database containing pattern data 230 and the one or more application programs or services for implementing the features disclosed herein, including an image processing module 216 and/or a mirror adjustment module 218.

In some embodiments, the image processing module 216 may be configured to receive image information from one or more input sensors and identify a viewer position from the image information. The image processing module 216 may receive, as input, a digital image (or link to a digital image) and may provide, as output, a set of coordinates. The image processing module 216 may utilize one or more image processing techniques in order to identify image patterns within the received image that correspond to an eye or eyes. In the case that two eyes are identified, the image processing module 216 may output coordinates located halfway between both eyes. In the case that a single eye is identified, the image processing module 216 may output the coordinates of the identified eye. In the case that more than two eyes are identified, the image processing module 216 may return an error or determine the set of eyes that are most likely correct. For example, the image processing module 216 may determine a particular set of eyes is likely the correct set of eyes based on the position and/or orientation of each eye.

In some embodiments, the mirror adjustment module 218 may be configured to receive viewer location data from the image processing module 216, and identify an appropriate mirror position based on that received data. For example, the mirror adjustment module 218 may receive viewer position coordinates from the image processing module 216 and create instructions for rotating the mirror unit so that it is directed halfway between the viewer position coordinates and a default position. The default position may be an origin (located at [0, 0] of a coordinate system) location. In some embodiments, the default position may be the center of a rear window, or the object to be viewed using the rear view mirror. By way of illustration, if the mirror adjustment module 218 receives the coordinates (22°, −18°) from the image processing module 216, then it may construct instructions for a first actuation device (configured to rotate the mirror around a vertical axis) to rotate the mirror to 11°, and a second actuation device (configured to rotate the mirror around a horizontal axis) to rotate the mirror to −9°.

Although described as being executed from the memory 220 of the service provider computer 206, the image processing module 216 and/or the mirror adjustment module 218 may be located on, and executed from, the memory 214 of the processor device 204. In embodiments in which one or more of the modules are located on the service provider computer 206, the instructions for rotating the mirror may be transmitted to the vehicle and executed by the rear view mirror system.

FIG. 3 depicts an example mirror unit that may be implemented in accordance with at least some embodiments. The mirror unit illustrated in FIG. 3 may be an example mirror unit 106 as depicted in FIG. 1. FIG. 3 is broken up into FIG. 3A, FIG. 3B, FIG. 3C, and FIG. 3D in order to better illustrate some features of the disclosure.

Figure 3B:
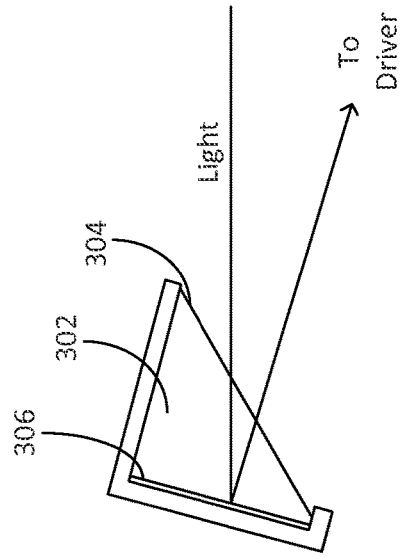
FIG. 3A, FIG. 3B, FIG. 3C and FIG. 3D depict an example mirror unit that may be implemented in accordance with at least some embodiments.
Figure 3A:
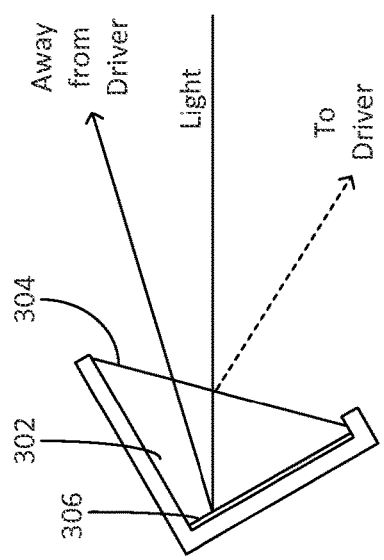

FIGS. 3A and 3B depict an illustration of mirror darkening techniques that may be implemented in a rear view mirror system to reduce headlight glare. FIG. 3A depicts an auto-darkening rear view mirror in a "night" position, utilized when the use of vehicle headlights is likely. As depicted, the mirror unit may be configured with a prismatic wedge mirror 302, or a mirror having a first reflective surface 304 and a second reflective surface 306 positioned at an angle. It should be noted that the angle between the first reflective surface 304 and the second reflective surface 306, as well as the resulting "tilt" between the "day" position and the "night" position, may be greatly exaggerated in FIG. 3 in order to better illustrate the principles of this disclosure. It should also be noted that the prismatic wedge mirror may be positioned such that it tapers in any direction. In this illustration, the first reflective surface 304 is a semi-transparent reflective surface, which allows most light to pass through it and reflects a small percentage of the light directed at the mirror unit. The second reflective surface 306 is a highly reflective surface (e.g., a silvered surface) that reflects the majority of the light directed to the mirror unit.

When in the "night" position, the mirror unit is tilted such that light from the first reflective surface 304 is directed at the driver. As depicted, with the use of a "night" position, the majority of the reflected incoming light is directed away from the driver. This prevents the driver from being blinded by headlight glare from the rear window.

FIG. 3B depicts an auto-darkening rear view mirror in a "day position," utilized when the use of vehicle headlights is unlikely. When in the "day" position, the mirror unit is tilted such that light from the second reflective surface 306 is directed at the driver. As depicted, with the use of a "day" position, the majority of the reflected incoming light is directed toward the driver, allowing him or her to see through the rear window.

In some embodiments, a rear view mirror system may include one or more photo detectors, such as a photovoltaic diode, to detect a light threshold. The rear view mirror system may be configured to switch between a "day" position and a "night" position automatically based on feedback from the photo detectors. For example, the rear view mirror system may include a photovoltaic diode that receives light from headlights directed at the rear view mirror system. If the received light is above a predetermined threshold, then the rear view mirror system may enter night mode. In another example, a photovoltaic diode may be used to determine if an illumination level outside the vehicle is above a predetermined threshold value. In this example, the rear view mirror system may be placed in a day position if the illumination level outside the vehicle is above the predetermined threshold value.

Figure 3D:
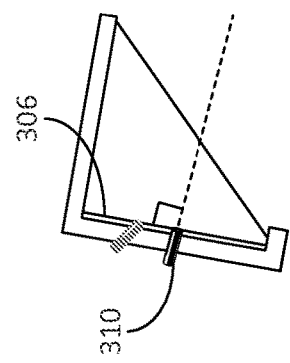
Figure 3C:
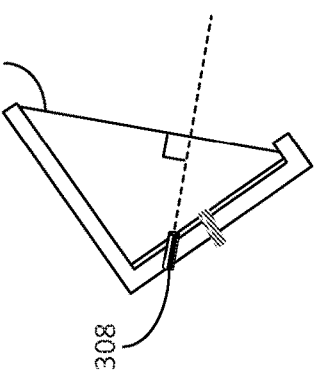

FIG. 3C depicts a first camera configured to automatically adjust to a user's position under "night" conditions. As depicted in FIG. 3C, camera 308 may be positioned such that the camera 308 line of sight is perpendicular to the first reflective surface 304. In some embodiments, the camera 308 may be embedded in the second reflective surface 306. In some embodiments, the camera 308 may be embedded in a surface of the mirror unit other than the second reflective surface. Camera 308 may be a pinhole camera. In some embodiments, camera 308 may include a wide-angle lens, (i.e., a lens with a focal length shorter than that of a normal lens) capable of capturing an extended image. In some embodiments, camera 308 may be a night vision or type of camera suited to capture images in low light level conditions.

FIG. 3D depicts a second camera configured to automatically adjust to a user's position under "day" conditions. As depicted in FIG. 3D, camera 310 may be positioned such that the camera 310 line of sight is perpendicular to the second reflective surface 306. Similar to camera 308, the camera 310 may be embedded in the second reflective surface 306. Camera 310 may also be a pinhole camera, and may include a wide-angle lens capable of capturing an extended image. Because camera 308 is positioned perpendicular to the first reflective surface 304 and camera 310 is positioned perpendicular to the second reflective surface 306, the angle between camera 308 and camera 310 should be equal to the angle of the prismatic wedge mirror 302.

It should be noted that the mirror unit may be configured to rotate the rear view mirror around a horizontal axis (up and down) and/or around a vertical axis (from side to side). In some embodiments, the actuation device that is configured to rotate the mirror unit around a horizontal axis may also be configured to place the mirror unit into either a "day" position or a "night" position. In some embodiments, the rear view mirror system may utilize separate actuation devices for the rotation of the mirror unit and switching between positions. For example, a first actuation device may be located within the mirror housing and may be used to rotate between the "day" and "night" position. In this example, a second actuation device may rotate the entire mirror housing in accordance with the described disclosure. In some embodiments, the mirror unit may be "flipped," or manually moved, to either position. As the mirror unit is changed from a "day" position to a "night" position, the active camera may change from camera device 310 to camera device 308 (image information may be received from camera 308 instead of camera 310) and vice versa.

In some embodiments, when the rear view mirror system switches from "night" position to "day" position, the rear view mirror system may also switch to receiving image information from camera 310 instead of from camera 308, and vice versa. In some embodiments, camera 308 may also be camera 310. For example, a single camera may be configured to rotate positions between that of 308 and 310 based on feedback received from a photovoltaic diode.

Figure 4:
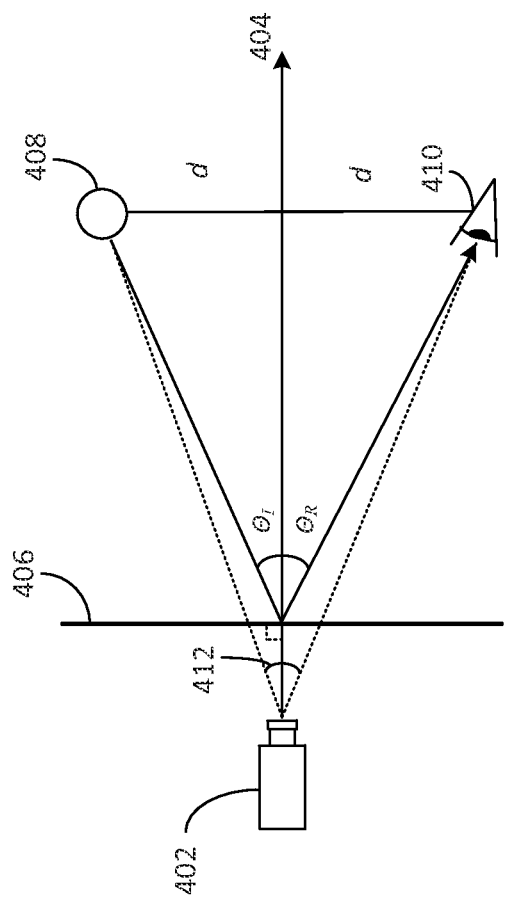
FIG. 4 depicts an illustration of camera/mirroring positioning that may be implemented in accordance with at least some embodiments of the current disclosure.

FIG. 4 depicts an illustration of camera/mirroring positioning that may be implemented in accordance with at least some embodiments of the current disclosure. In FIG. 4, a camera 402 is positioned such that a line of sight 404 of the camera 402 is perpendicular to a reflective surface 406. Camera 402 may be an example camera 308 of FIG. 3, or it may be an example camera 310 of FIG. 3. The reflective surface 406 may be an example first reflective surface 304 of FIG. 3, or an example second reflective surface 306 of FIG. 3.

Depicted in FIG. 4 is an object position 408 and a viewer position 410. In accordance with at least some embodiments, the rear view mirror system may determine an angle 412 between the object 408 and the viewer 410. In some embodiments, the rear view mirror system may calculate a distance between the object position 408 and the viewer position 410 on an image captured by camera 402. The calculated distance may correlate to an angle 412. The rear view mirror system may adjust the position of the camera 402 and the reflective surface 406 (e.g., by causing a rotation of a mirror unit) so that the line of sight 404 is positioned halfway between the object position 408 and the viewer position 410 (where a distance d from the line of sight 404 to the default location 408 is equal to the distance from the line of sight 404 to the viewer location 410). Accordingly, an incident angle $\Theta_I$ is created that is equal to a reflected angle $\Theta_R$ and the viewer 410 is able to see the object 408 in the reflective surface 406.

In some embodiments, the object position 408 may be a known position, such as the center of a rear window of a vehicle. In some embodiments, the rear view mirror system may begin in a default position in which the line of sight 404 is directed at the object position 408. Upon detecting the viewer position 410, the rear view mirror system may be repositioned such that the line of sight 404 bisects the default position (directed at the object position 408) and the viewer position 410.

It should be noted that FIG. 4 is used to depict the proper positioning of the mirror surface with respect to the location of the driver's eyes and the default position. Although depicted in two dimensions, it should be noted that the illustration applies equally to a vertical distance between the location of the driver's eyes and the default position as well as a horizontal distance between the location of the driver's eyes and the default position. Accordingly, a mirror unit may be rotated around a horizontal axis (from side to side) as well as around a vertical axis (up and down). These rotations may each be carried out by two separate actuation devices. In some embodiments, instructions may be provided to a first actuation device to position the mirror along the vertical distance between the location of the driver's eyes and the default position. Separate instructions may be provided to a second actuation device to position the mirror along the horizontal distance between the location of the driver's eyes and the default position.

FIG. 5 depicts example rear view images that may be captured and used to adjust to an appropriate mirror position in accordance with at least some embodiments. In FIG. 5, a first image 502 is captured. The center of image 502, referred to as the focus 504, is depicted as being aligned with a default position 506. In some embodiments, the default position 506 may be the center of a rear window 508 of a vehicle. The default position 506 may be stored in memory, such that all measurements are made with respect to the default position 506. In some embodiments, the default position 506 may represent an origin point of a coordinate system utilized by the rear view mirror system. In accordance with at least some embodiments of the rear view mirror system, the mirror may return to a default state (e.g., where the reflective surface and camera are pointed at a default position) if the mirror is knocked out of place, or if the vehicle is turned off.

The rear view mirror system may be configured to identify a viewer position 510. One or more image processing techniques (e.g., pattern recognition, computer vision, etc.) may be used to identify a user's eye or eyes in image 502. For example, the rear view mirror system may include a processor device configured to detect a particular pattern or patterns indicative of a user's eyes. In some cases, the processor device may identify a set of two eyes, in which case, the viewer position 510 may be determined as a point halfway between the two eyes. In some cases, the processor device may identify a single eye, in which case, the viewer position 510 may be determined as the center of the eye. The rear view mirror system may then identify coordinates of the viewer position 510 within a coordinate system. For example, the viewer position 508 may be located at a position (x, y), where the default position 506 is at the origin (0, 0). In some embodiments, the coordinate system may coincide with angular locations (measured in degrees).

Once the viewer position 510 is identified with respect to the default position 506, the mirror unit may be repositioned so that the focus 504 is located halfway between the viewer position 510 and the default position 506. Image 512 provides an illustrative example of an image taken by a camera after being moved to the new position. As pointed out with respect to FIG. 4, this enables the viewer to see objects at the default position 506 in the mirror. In the depicted image 512, the rear view mirror has rotated down, such that the focus 504 has moved along the vertical distance between the viewer position 510 and the default position in the image from the default position 506 to position y/2 (halfway to the viewer position 510 at y). Additionally, the rear view mirror has rotated sideways, such that the focus 504 has moved along the horizontal distance between the viewer position 510 and the default position 506 in the image from the default position 506 to position x/2 (halfway to the viewer position 510 at x).

Figure 6:
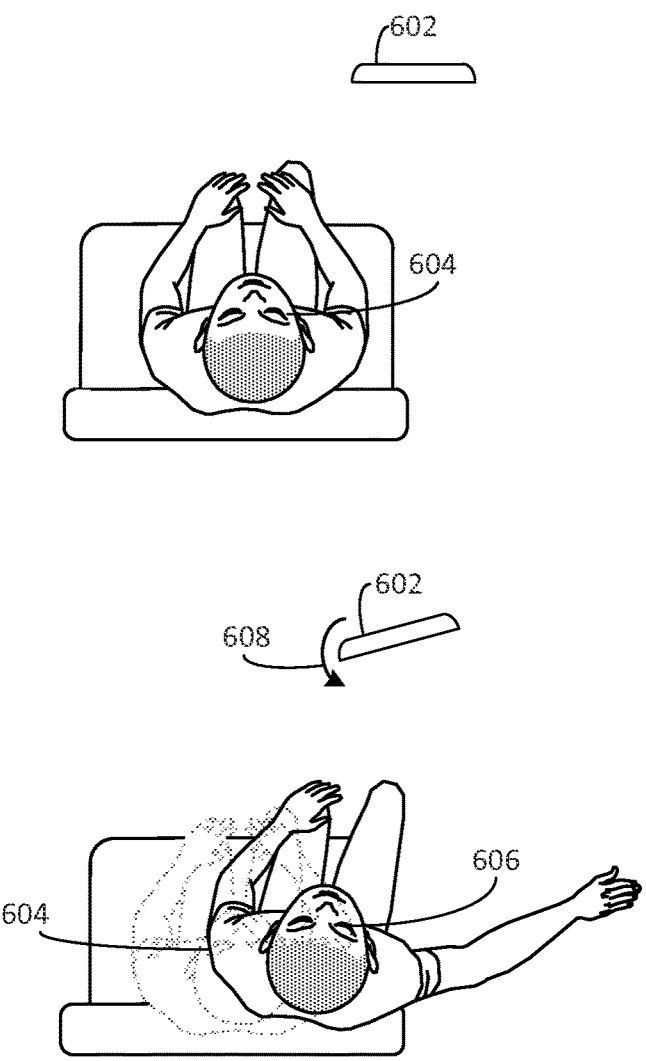
FIG. 6 depicts an example of a rear view mirror system that is configured to automatically adjust to user movement in accordance with at least some embodiments.

FIG. 6 depicts an example of a rear view mirror system that is configured to automatically adjust to user movement in accordance with at least some embodiments. In some embodiments, the rear view mirror 602 may be adjusted to a user's position upon detecting a repositioning event (e.g., a startup of the car's engine, buckling of a safety belt, closing of a door, etc.). In accordance with at least some embodiments, the rear view mirror 602 may be placed into a "follow" mode, such that it continuously readjusted to connect a user's line of sight with a rear window. For example, the camera may continuously feed user position data to a processing device (e.g., by providing video data, or still image data on a periodic basis). Upon detecting that a user's view position has changed from a first position 604 to a second position 606, the mirror 602 may be subjected to a repositioning 608 that is calculated to result in the user maintaining eye contact with the rear window.

In some embodiments, the mirror 602 may include a button or switch for activating and/or deactivating a "follow" mode (automatic continuous adjustment mode). In some embodiments, the mirror 602 may deactivate "follow" mode upon being repositioned manually. In some embodiments, the mirror 602 may return to a default position upon detecting that the user's eyes cannot be detected. In some embodiments, the mirror 602 may remain in its current position upon detecting that the user's eyes cannot be detected.

Figure 7:
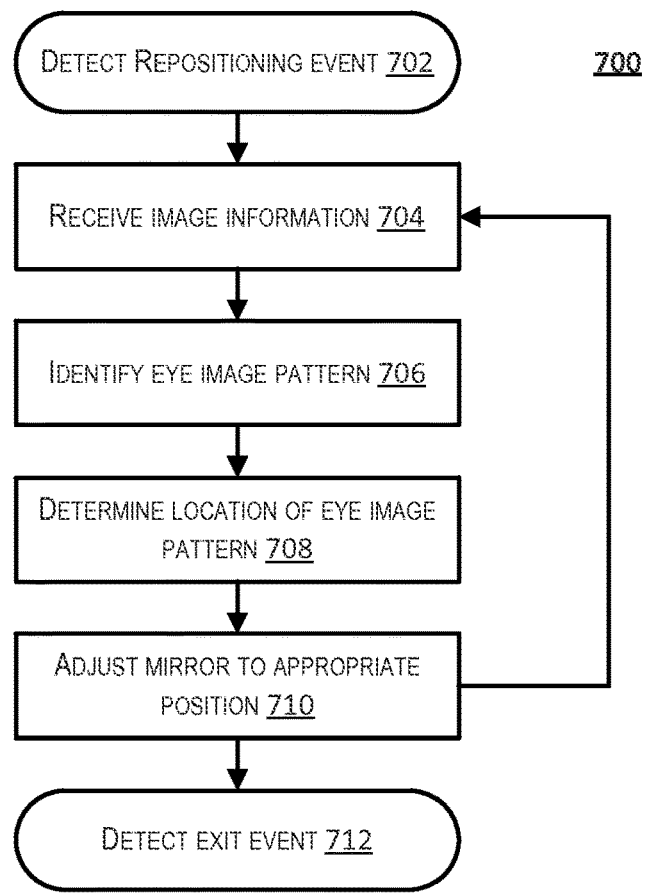
FIG. 7 depicts an illustrative flow chart demonstrating an example adjustment to a rear view mirror in accordance with at least some embodiments.

FIG. 7 depicts an illustrative flow chart demonstrating an example adjustment to a rear view mirror in accordance with at least some embodiments. The process 700 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 700 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 700 of FIG. 7 may be performed by at least the one or more service provider computers 206 shown in FIG. 2. The code may be stored on a computer-readable storage medium, for example, in the form of a computer program including a plurality of instructions executable by one or more processors. The computer-readable storage medium may be non-transitory.

Process 700 may begin at 702, when a repositioning event is detected. A repositioning event may be any event that may be used to determine that a mirror adjustment may be necessary. For example, a repositioning event may be a startup of the car's engine, buckling of a safety belt, closing of a door, or any other suitable event indicating that a driver may have been repositioned or newly positioned. In some embodiments, the repositioning event may be the selection of an auto-adjust button or switch. In some embodiments, the repositioning event may be the detection of a driver's movement within a driver seat. For example, a pressure sensor may detect that the driver is leaning, and may subsequently trigger a repositioning event.

Once a repositioning event is detected, image information may be received from one or more input sensors at 704. In some embodiments, the rear view mirror system may include multiple camera devices. One or more camera devices may be activated upon detecting particular conditions. For example, the rear view mirror system may include a first camera 308 and a second camera 310, as depicted in FIG. 3. In this example, the first camera 308 may be activated when the rear view mirror system is in a "night" position and the second camera 310 may be activated with the rear view mirror is in a "day" position. Image information may subsequently be obtained from the activated camera.

The received image information may be processed by an image processing module in order to identify an eye pattern at 706. In some embodiments, the image processing module may reside in the memory of a processing device located within the vehicle itself. In some embodiments, the rear view mirror system may be in communication with a service provider computer that stores and executes the image processing module. In some embodiments, visual patterns in the received image information may be compared to known eye pattern structures in order to identify an eye pattern. In some embodiments, the rear view mirror system may be "trained" with a particular user's eye. For example, the first time that a new driver attempts to drive a vehicle, he or she may be asked to provide a close-up image of his or her eye. In this example, the service provider computer may add a pattern related to the user's eye to a pattern recognition database.

Once an eye pattern has been identified, the location of the eye pattern may be determined at 708. In some embodiments, the image information may be associated with a grid, or coordinate, system. The coordinates may be associated with a degree of rotation. In some embodiments, the location of the eye pattern may be identified with respect to a default location. For example, the eye pattern location may be identified with respect to the center of the rear window.

The detected eye pattern location may be provided to a mirror adjustment module in order to provide instructions for adjusting the mirror to an appropriate position at 710. The mirror adjustment module may subsequently create instructions for rotating the mirror unit so that it is directed halfway between the detected eye pattern location and a default position. In some embodiments, the mirror adjustment module may provide dual instructions, one for adjusting the mirror along a vertical axis, and one for adjusting the mirror along a horizontal axis. The instructions may be used by one or more tilt actuation devices depicted in FIG. 1 to reposition the mirror unit.

In some embodiments, the process 700 may continue to readjust the mirror's position as a driver is repositioned. In these embodiments, the process 700 may repeat steps 704 through 710 indefinitely, or until the process is broken by the detection of an exit event at 712. For example an exit event may be a shutdown of the car's engine, an unbuckling of a safety belt, closing of a door, or any other suitable event indicating that a repositioning of the mirror is no longer needed. In some embodiments, the exit event may be the switching off of a "follow" mode switch.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A rear view mirror apparatus, comprising:
a mirror housing;
a planar reflective surface;
a camera device configured to capture image information, the camera device positioned within the mirror housing perpendicular to the reflective surface;
a processor device configured to:
receive, from the camera device, an image that includes a representation of at least a portion of a driver, the portion of the driver including at least a representation of at least one eye belonging to the user;
identify, within the image, the representation of at least one eye belonging to the driver;
determine a first set of coordinates associated with a point of origin in the image with respect to a coordinate system;
determine a second set of coordinates associated with the at least one eye in the image with respect to the coordinate system;
determine a third set of coordinates that comprises a point located halfway between the first set of coordinates and the second set of coordinates with respect to the coordinate system;
determine an adjusted position for the reflective surface based at least in part on the captured image information, wherein the adjusted position comprises a position for which a line of sight of the camera device is aimed directly at the third set of coordinates; and
a first actuation device configured to rotate the reflective surface and camera device within the mirror housing into the adjusted position in accordance with instructions received from the processor device.

2. The rear view mirror apparatus of claim 1, further comprising a second actuation device configured to rotate the mirror housing based at least in part on the identified adjusted position.

3. The rear view mirror apparatus of claim 1, wherein the reflective surface is semi-transparent.

4. The rear view mirror apparatus of claim 3, wherein the camera is located within the mirror housing, behind the reflective surface.

5. The rear view mirror apparatus of claim 1, further comprising a second reflective surface configured to reflect light away from the driver.

6. A method comprising:
receiving, from a camera device located perpendicular to a mirror surface, an image including at least a representation of a partial image of a driver;
identifying, using one or more image processing techniques, a location of an eye of the driver within the received image;
determining, based on the location of the eye of the driver, a first set of coordinates associated with the eye of the driver within a coordinate system;
determining a second set of coordinates associated with a point of origin within the coordinate system;
determining a third set of coordinates that comprises a point located halfway between the first set of coordinates and the second set of coordinates with respect to the coordinate system;
determine an adjusted position for the camera device, wherein the adjusted position comprises a position for which a line of sight of the camera device is aimed directly at the third set of coordinates; and
adjusting a current position of the camera device and mirror surface to the adjusted position.

7. The method of claim 6, further comprising:
receiving an updated image information;
determining that the location of the eye of the driver has changed in the updated image information; and
re-adjusting the mirror surface so that the focus of the camera device is located halfway between the location of the eye of the driver and the default position within the image information.

8. The method of claim 7, wherein the updated image information is received on a periodic basis.

9. The method of claim 6, wherein the mirror surface is positioned such that a line of sight of the camera perpendicular to the mirror surface bisects the location of the eye of the driver and the default position.

10. The method of claim 6, wherein the location of the eye of the driver is identified by matching patterns in the image information with at least one stored eye pattern.

11. The method of claim 6, wherein the default position is the center of a rear window of the vehicle within the image.

12. A vehicle rear-view mirror system, comprising:
a mirror housing;
a mirror unit configured to rest within the mirror housing, the mirror unit including at least one camera and at least one reflective surface, the at least one camera being perpendicular to the at least one reflective surface;
a first actuation device configured to rotate the mirror unit within the mirror housing;
a processor device; and
a memory including instructions that, when executed with the processor device, cause the system to, at least:
capture, via the camera device, an image that includes at least a driver;
identify, within the image, a representation of an eye of the driver;
determine, based on the identified eye of the driver, a first set of coordinates associated with the eye of the driver within a coordinate system;
determine a second set of coordinates associated with a point of origin within the coordinate system;
determine a third set of coordinates that represents a point located halfway between the first set of coordinates and the second set of coordinates with respect to the coordinate system;
determine a degree of rotation needed to aim the at least one camera at the third set of coordinates; and
provide, to the first actuation device, instructions to rotate the mirror unit within the mirror housing such that the at least one camera and the at least one reflective surface is at the determined degree of rotation.

13. The vehicle rear-view mirror system of claim 12, wherein the first actuation device is a servomotor.

14. The vehicle rear-view mirror system of claim 12, further comprising:
a second actuation device configured to rotate the mirror housing; and
wherein the instructions further cause the system to at least:
determine, from the image information, a second degree of rotation; and
provide, to the second actuation device, instructions to rotate the mirror housing such that the at least one reflective surface is at the determined second degree of rotation.

15. The vehicle rear-view mirror system of claim 12, wherein the at least one reflective surface comprises a semi-transparent first reflective surface and a second reflective surface.

16. The vehicle rear-view mirror system of claim 15, wherein the at least one camera device comprises a first camera device positioned perpendicular to the first reflective surface and a second camera device positioned perpendicular to the second reflective surface.

17. The vehicle rear-view mirror system of claim 16, wherein image information captured by the first camera device is used to determine the degree of rotation for the semi-transparent first reflective surface.

18. The vehicle rear-view mirror system of claim 12, wherein the instructions are executed upon detecting a repositioning event.

* * * * *